United States Patent
Yaroshchuk et al.

(10) Patent No.: US 11,561,507 B2
(45) Date of Patent: Jan. 24, 2023

(54) METHODS FOR THREE-DIMENSIONAL ARRANGEMENT OF ANISOTROPIC MOLECULES, PATTERNED ANISOTROPIC FILMS, AND OPTICAL ELEMENTS THEREWITH

(71) Applicant: META PLATFORMS TECHNOLOGIES, LLC, Menlo Park, CA (US)

(72) Inventors: Oleg Yaroshchuk, Redmond, WA (US); Wai Sze Tiffany Lam, Vancouver (CA); Scott Charles McEldowney, Redmond, WA (US); Lu Lu, Kirkland, WA (US)

(73) Assignee: META PLATFORMS TECHNOLOGIES, LLC, Menlo Park, CA (US)

( * ) Notice: Subject to any disclaimer, the term of this patent is extended or adjusted under 35 U.S.C. 154(b) by 788 days.

(21) Appl. No.: 16/273,068

(22) Filed: Feb. 11, 2019

(65) Prior Publication Data
US 2019/0317450 A1 Oct. 17, 2019

Related U.S. Application Data

(60) Provisional application No. 62/728,053, filed on Sep. 6, 2018, provisional application No. 62/659,104, filed on Apr. 17, 2018.

(51) Int. Cl.
*G03H 1/02* (2006.01)
*G03H 1/04* (2006.01)
*G03H 1/18* (2006.01)

(52) U.S. Cl.
CPC ............... *G03H 1/041* (2013.01); *G03H 1/02* (2013.01); *G03H 1/18* (2013.01);
(Continued)

(58) Field of Classification Search
CPC .... G03H 1/041; G03H 1/02; G03H 2001/026; G03H 1/18
See application file for complete search history.

(56) References Cited

U.S. PATENT DOCUMENTS 3,707,371 A * 12/1972 Files .................... G03H 1/0248
430/270.1
3,953,212 A 4/1976 Miyano et al.
(Continued)

FOREIGN PATENT DOCUMENTS

CN 1728246 A 2/2006
CN 102005213 A 4/2011
(Continued)

OTHER PUBLICATIONS

Blanche et al. "Polarization holography receals the nature of the grating in polymers containing azo-dye", Optics Communications, vol. 185, No. 1-3, (2000), 15 pgs.
(Continued)

*Primary Examiner* — Peter L Vajda
*Assistant Examiner* — Jayson D Cosgrove
(74) *Attorney, Agent, or Firm* — Morgan, Lewis & Bockius LLP

(57) ABSTRACT

The invention relates to a method of creation of three-dimensional alignment patterns that includes providing a layer of optically recordable and polarization sensitive material having a thickness that is greater than, or equal to, a predefined thickness, and concurrently illuminating the optically recordable medium with two coherent beam of same or different polarization with predetermined angle between the beams such that the said beams impinge from the same side or from the opposite sides upon the layer of the recordable material. The invention further relates to polarization volume holograms based on the said alignment patterns and polarization holographic element including a single layer or
(Continued)

a stack of several layers of optically recordable materials containing single or multiple polarization volume holograms.

15 Claims, 11 Drawing Sheets

(52) U.S. Cl.
CPC ............... *G03H 2001/026* (2013.01); *G03H 2001/0484* (2013.01); *G03H 2210/10* (2013.01); *G03H 2222/34* (2013.01); *G03H 2223/24* (2013.01)

(56) References Cited

U.S. PATENT DOCUMENTS

| | | | |
|---|---|---|---|
| 3,953,303 A | 4/1976 | Kamada et al. | |
| 4,055,423 A | 10/1977 | Bartolini et al. | |
| 6,280,884 B1* | 8/2001 | Bjorklund | G02F 1/3615 359/3 |
| 6,572,939 B2 | 6/2003 | Kwon et al. | |
| 6,721,076 B2* | 4/2004 | King | G03H 1/04 359/10 |
| 7,319,550 B2* | 1/2008 | Hayashi | G06K 19/06046 283/86 |
| 9,360,708 B2 | 6/2016 | Schadt et al. | |
| 2004/0240012 A1* | 12/2004 | Yasuda | G03H 1/16 359/24 |
| 2005/0140837 A1 | 6/2005 | Crawford et al. | |
| 2005/0231774 A1 | 10/2005 | Hayashi et al. | |
| 2005/0233094 A1 | 10/2005 | Sawatari et al. | |
| 2008/0102378 A1* | 5/2008 | Cole | G11B 7/24044 430/2 |
| 2009/0225642 A1 | 9/2009 | Tukker et al. | |
| 2012/0147724 A1* | 6/2012 | Natarajan | G11B 7/00772 369/103 |
| 2014/0022615 A1* | 1/2014 | Clemens | G03H 1/0005 359/10 |
| 2014/0154428 A1 | 6/2014 | Schadt et al. | |
| 2015/0077700 A1 | 3/2015 | De Sio et al. | |
| 2016/0033698 A1 | 2/2016 | Escuti et al. | |
| 2018/0244922 A1 | 8/2018 | Nagi | |

FOREIGN PATENT DOCUMENTS

| | | |
|---|---|---|
| CN | 104090328 A | 10/2014 |
| CN | 104704406 B | 8/2017 |
| JP | S63161444 A | 7/1988 |
| JP | H11181127 A | 7/1999 |
| JP | 2005091939 A | 4/2005 |
| JP | 2005272532 A | 10/2005 |
| JP | 2014146045 A | 8/2014 |
| JP | 2017090934 A | 5/2017 |
| JP | 2017146523 A | 8/2017 |
| KR | 20160114674 A | 10/2016 |
| WO | WO-0196962 A2 * 12/2001 ........... G03F 7/2051 |
| WO | 2014017497 A1 | 1/2014 |

OTHER PUBLICATIONS

Broer et al. "In-situ photopolymerization of oriented liquid-crystalline acrylates, 3.* Influence of a lateral methyl substituent on monomer and oriented polymer network properties of a mesogenic diacrylate", Macromolecular Chemistry and Physics, vol. 190, Issue 12, Dec. 1989, pp. 3201-3215.
Du et al. "Complex Nanoscale-Ordered Liquid Crystal Polymer Film for High Transmittance Holographic Polarizer", Advanced Materials, vol. Issue 44, Nov. 25, 2015, pp. 7191-7195.
Escuti et al. "Simplified spectropolarimetry using reactive mesogen polarization gratings", SPIE Proceedings vol. 6302, Imaging Spectrometry XI; 2006, 13 pgs.
Gao et al. "High-efficiency large-angle Pancharatnam phase deflector based on dual-twist design", Optics Express (OSA), vol. 25, No. 6, Mar. 20, 2017, 9 pgs.
Gregory P. Crawford, "Liquid-crystal diffraction gratings using polarization holography alignment techniques", Journal of Applied Physics 98, 123102 (2005); 10 pgs.
Honma et al. "Twisted nematic liquid crystal polarization grating with the handedness conservation of a circularly polarized state", Optics Express (OSA), vol. 20, No. 16, Jul. 30, 2012, 10 pgs.
Hyunhee Choi. "Microstructure of Reflection Holographic Graating Inscribed in an Absorptive Azopolymer Film", Arxive, Journal of Korean Phyiscal Society (Springer), vol. 67, Issue 9, Nov. 2015, 12 pgs.
Ishiguro et al. "Bragg-Type Polarization Gratings Formed in Thick Polymer Films Containing Azobenzene and Tolane Moieties", Langmuir 23, 332-338, (2007), 7pgs.
Kakichashvili et al. "Method of Recording Phase Polarization Holograms", Sov. J. Quantum Electronics Quantum Electronics, vol. 4, No. 6, 1974, 5 pgs.
Kawatsuki et al. "Formation of polarization gratings in photocrosslink-able polymer liquid crystals by polarization holography", Advanced Materials, vol. 15(2), 2003, 4 pgs,
Kim et al. "Wide-angle, nonmechanical beam steering using thin liquid crystal polarization gratings", Proceedings of SPIE, Proc. SPIE 7093, aug. 26, 2008, 12 pgs.
Lin et al. "Volume polarization holographic recording in thick photopolymer for optical memory", Optics Express (OSA), vol. 22, No. 12, Jun. 16, 2014, 14 pgs.
Lin et al. . "Volume polarization holographic recording in thick phenanthrenequinone-doped poly(methyl methacrylate) photopolymer", Optics Letters (OSA), vol. 36, No. 16, Aug. 15, 2011, 3 pgs.
Nikolova et al. "Polarization reflection holographic gratings in azobenzene-containing gelatine films", Optics Letters (OSA), vol. 27, No. 2, Jan. 15, 2002, 3 pgs.
Ono et al. "Multiplex diffraction from functionalized polymer liquid crystals and polarization conversion", Applied Optics (OSA), vol. 11(19), 2003, 6 pgs.
Popov et al. "Chiral nematic liquid crystal microlenses", Scientific Reports (Nature)Scientific Reports, vol. 7, Article No. 1603, (2017), 9 pgs.
Rosenhauer et al. "Generation of Anisotropic Emission by Light-Induced Orientation of Liquid Crystalline Polymers", vol. 44., 2011, pp. 1438-1449.
Sakhno et al. "Fabrication and performance of efficient thin circular polarization gratings with Bragg properties using bulk photo-alignment of a liquid crystalline polymer", Applied Physics B, vol. 124:52, (2018), 10 pgs.
Schadt et al. "Liquid crystal displays, LC-materials and LPP photo-alignment", Molecular Crystals and Liquid Crystals, vol. 647, 2017, pp. 253-268.
Stracke et al. "Gain Effects in Optical Storage: Thermal Induction of a Surface Relief Grating in a Smectic Liquid Crystal", Advanced Material, vol. 12, No. 4, 4 pgs.
Todorov et al. "Polarization holography. 1: A new high-efficiency organic material with reversible photoinduced birefringence", Applied Optics (OSA), vol. 23, No. 23, Dec. 1, 1984, 4 pgs.
Todorov et al. "Polarization holography. 2: Polarization holographic gratings in photoanisotropic materials with and without intrinsic birefringence", Applied Optics (OSA), vol. 23, Issue 24, 1984, pp. 4588-4591.
Todorow et al. "Polarization holographic gratings in side-chain azobenzene polyesters with linear and circular photoanisotropy", Applied Optics (OSA), vol. 35, Issue 20, 1996, pp. 3835-3840.
Weng et al. "Polarization vol. grating with high efficiency and large diffraction angle", Optics Express (OSA), vol. 24, No. 16, Aug. 8, 2016, 14 pgs.
Yaroshchuk et al. "Photoalignment of liquid crystals: basics and current trends", Journal of Materials Chemistry, J. Mater. Chem., vol. 22, 2012, 15 pgs.
Emoto A., et al., "Large Birefringence and Polarization Holographic Gratings Formed in Photocross-Linkable Liquid Crystals Comprising Bistolane Mesogenic Side Groups," Journal of Applied Physics, Oct. 7, 2009, vol. 106, No. 073505, 6 pages.

(56) References Cited

OTHER PUBLICATIONS

Machine Transaltion of JP2005-091939, 2005, 22 pages.
Machine Translation of JP63-161444, 1988, 8 pages.
Machine Translation of WO2014/017497, 2014, 21 pages.
Non-Final Office Action dated Feb. 24, 2022 for U.S. Appl. No. 16/443,506, filed Jun. 17, 2019, 18 pages.
Office Action dated Mar. 23, 2022 for Chinese Application No. 201910304723.3, 15 pages.
Sakhno O., et al., "Bragg Polarization Gratings Used as Switchable Elements in AR/VR Holographic Displays," Proceedings of SPIE, May 21, 2018, vol. 10676, No. 106760F, 18 pages.
Schmitt K., et al., "Pulsed Laser Induced Holographic Gratings for Waveguides Made of Cross-Linkable Polymers", Applied Optics, Jul. 20, 1997, vol. 36, No. 21, pp. 5078-5082.
Final Office Action dated Jul. 13, 2022 for U.S. Appl. No. 16/443,506, filed Jun. 17, 2019, 21 pages.
Machine Translation of JP2017-146523, 2017, 38 pages.
Non-Final Office Action dated Jul. 21, 2022 for U.S. Appl. No. 17/073,249, filed Oct. 16, 2020, 8 pages.

\* cited by examiner

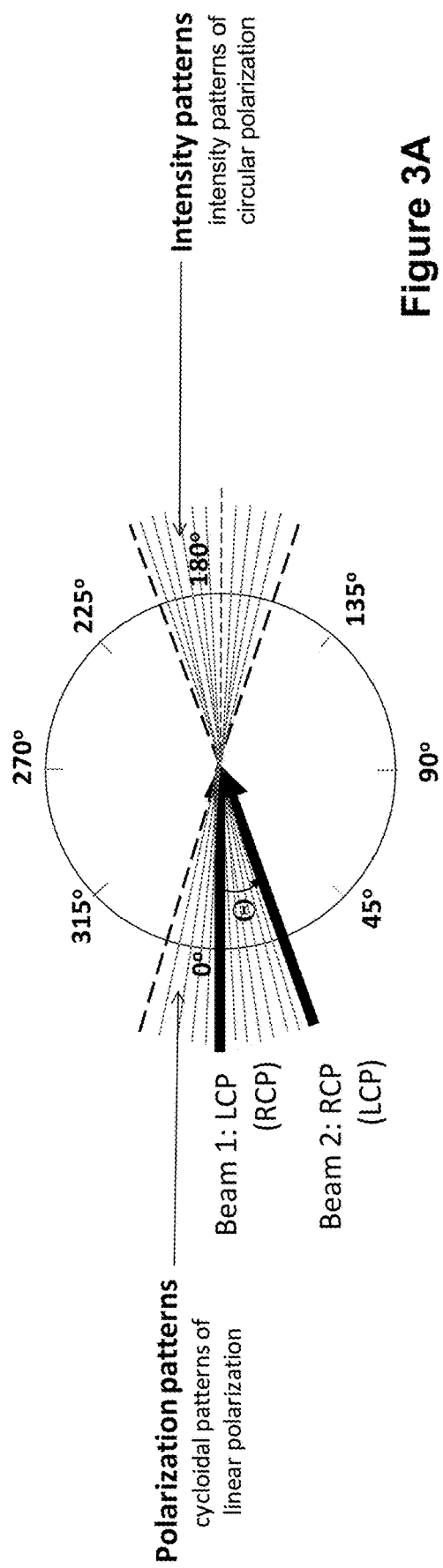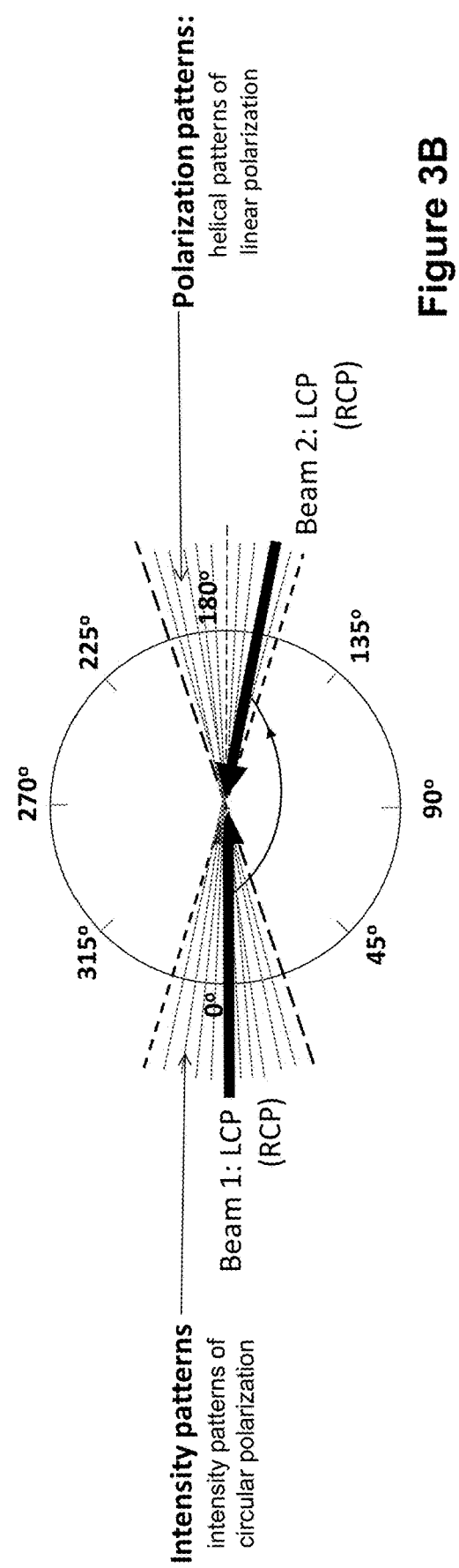

METHODS FOR THREE-DIMENSIONAL ARRANGEMENT OF ANISOTROPIC MOLECULES, PATTERNED ANISOTROPIC FILMS, AND OPTICAL ELEMENTS THEREWITH

RELATED APPLICATIONS

This application claims the benefit of, and priority to, U.S. Provisional Patent Application Ser. No. 62/659,104, filed Apr. 17, 2018 and U.S. Provisional Patent Application Ser. No. 62/728,053, filed Sep. 6, 2018, both of which are incorporated by reference herein in their entireties.

TECHNICAL FIELD

This relates generally to optical elements, and in particular to anisotropic optical elements.

BACKGROUND

Polarization volume gratings and optical elements based on them have gained increasing interest for applications in optics, such as beam steering devices, waveguides, and display technologies.

Conventionally, polarization volume gratings were made by patterned alignment of liquid crystals (LC) or reactive mesogens (RM) as their polymerizable version using a photoalignment layer. In this case, the photoalignment layer includes elongated anisotropically absorbing molecular units (small molecules or fragments of polymeric molecules) arranged in a particular periodic pattern usually produced by holographic technique, and liquid crystal is deposited on the photoalignment layer so that the liquid crystal molecules are aligned along the local alignment direction of said molecular units in photoaligning layer. However, when the photoalignment layer is used, liquid crystals can be arranged in only certain three-dimensional configurations (e.g., only along the plane defined by the photoalignment layer). Furthermore, the preparation of these elements includes many technical steps and thus, is rather complicated.

SUMMARY

Accordingly, there is a need of methods for making polarization volume holographic elements without using a photoalignment layer. Such methods will allow making polarization volume holographic elements in a simpler way and with orientational configurations that were not possible with the methods using photoalignment layers. In addition, polarization volume holographic elements made by such methods have properties that are not available from polarization volume holographic elements made by methods using photoalignment layers. Finally, preparation procedure of such elements is simplified comparing with prior art elements based on photoalignment layers.

The above deficiencies and other problems associated with photoalignment layers are reduced or eliminated by the methods and devices described herein.

In accordance with some embodiments, a method for making a polarization volume grating (hologram) and an optical element therewith includes providing a layer of optically recordable medium, which includes photocrosslinkable and photoalignable material having a first surface and a second surface that is opposite to the first surface and thickness that is greater than, or equal to, a predefined thickness needed to meet condition:

$$Q = \frac{2\pi \lambda d}{n \Lambda^2} \geq 10,$$

where Q is Klein parameter, d is a thickness of the grating, $\lambda$ is the wavelength of light, $\Lambda$ is the grating period, and n is an averaged refractive index of the recordable medium. The method further includes concurrently illuminating the said layer of the optically recordable material with two coherent beams of circularly polarized light incident on same or opposite surfaces of the layer wherein configuration, orientation and periodicity of grating patterns is determined by the conditions including angle between the beams, shape of wave fronts of the beams, and orientation of the layer of recordable material with respect to the beams.

In one particular embodiment, there is provided a method for making a polarization volume hologram wherein a layer of said recordable medium is concurrently illuminated with two coherent beams having orthogonal circular polarizations which intersect in the recordable medium at angle equal or less than 40 degrees thereby producing cycloidal patterns of linear or quasilinear polarization, which induce similar orientational patterns in the recordable material.

In another particular embodiment, there is provided a method for making a polarization volume hologram wherein a layer of said recordable medium concurrently illuminated with two coherent beams having same circular polarizations which intersect in the recordable medium at angle 180±40 degrees thereby producing helical patterns of linear or quasilinear polarization, which induce similar orientational patterns in the recordable material.

In accordance with one more embodiment, a method for making a polarization volume holographic element includes recording two and more polarization volume gratings in same layer of optically recordable medium.

In accordance with even one more embodiment, a method for making a polarization volume holographic element includes stacking of two and more layers each of which contains one or more polarization volume holograms.

In accordance with some embodiments, a layer of optically recordable material includes periodic orientational patterns induced by any method described herein.

Thus, the disclosed embodiments provide polarization volume holographic elements that do not include photoalignment layers and methods for making them.

BRIEF DESCRIPTION OF THE DRAWINGS

For a better understanding of the various described embodiments, reference should be made to the Description of Embodiments below, in conjunction with the following drawings in which like reference numerals refer to corresponding parts throughout the figures.

FIG. 3A is a schematic representation of the interference modes of two coherent beams having orthogonal circular polarizations depending on the convergence angle and polarization state of the beams.

FIG. 3B is a schematic representation of the interference modes of two coherent beams having the same circular polarization depending on the convergence angle and polarization state of the beams.

Figure 1:
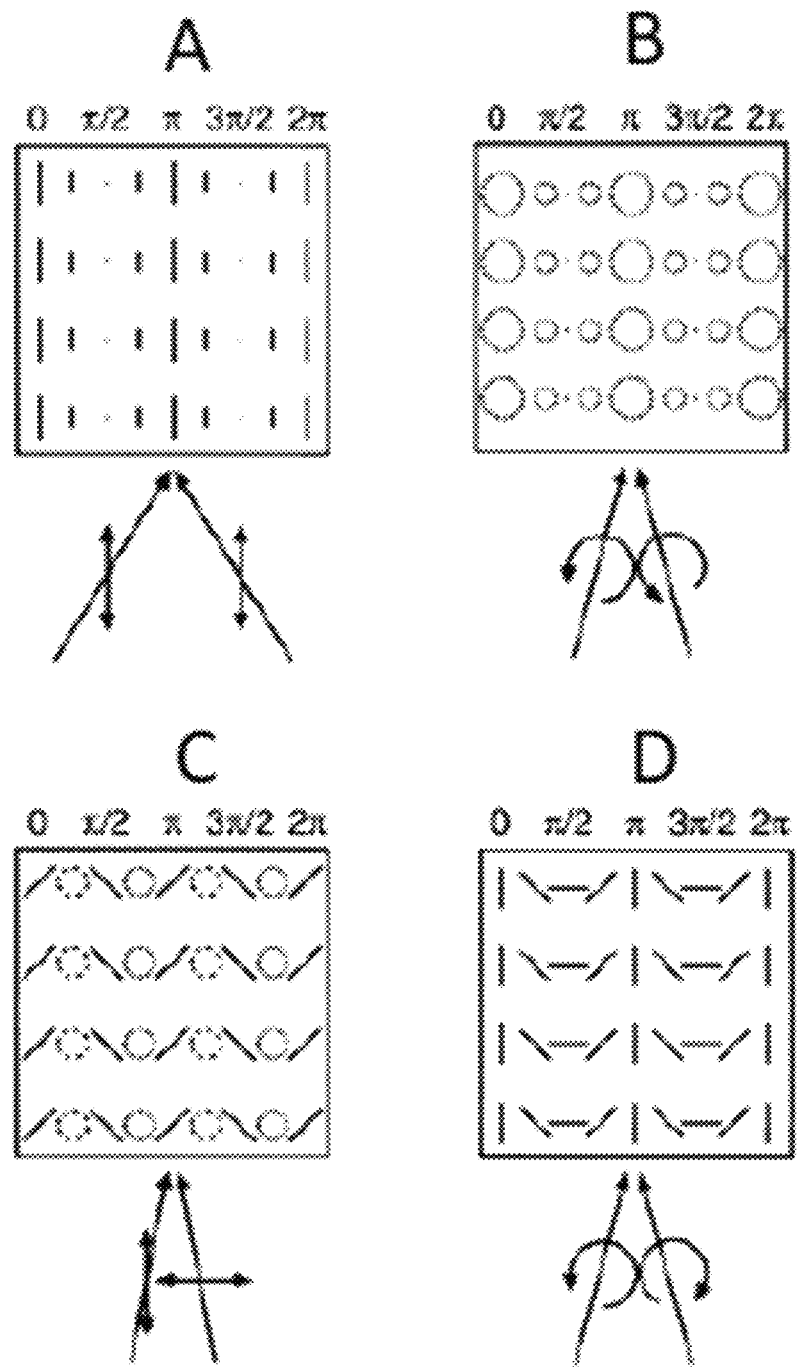
FIG. 1 illustrates interference patterns formed on a two-dimensional plane by polarized light.

These figures are not drawn to scale unless indicated otherwise.

DETAILED DESCRIPTION

The present disclosure describes method for making spatial periodic orientational patterns, methods and devices for making optical elements from an optically recordable and polarization sensitive medium, which includes photocrosslinkable and photoalignable molecules or molecular fragments. The method includes concurrently illuminating the optically recordable medium with two coherent beams of light having same or different polarization properties. In some embodiments, a polarization volume holographic element is made by such methods and devices.

Holographic volume gratings (HVG) are diffractive elements including a periodic pattern of absorption or phase stretching throughout the entire volume of the element. Such a grating formed by interference pattern of light in an optical recordable material. Typically, such materials are optically isotropic photo-polymeric compositions in which the induced contrast of refractive index achieves 0.03-0.04. The diffraction efficiency of these gratings can be close to 100% if the Bragg condition is met, which in case of recording beams and testing beam with flat wave fronts has the form:

$$2N\Lambda \sin(\theta+\varphi)=\lambda_B$$

where N is a positive integer, $\Lambda$ is the grating period, $\theta$ is the incident angle of the testing beam (the angle between the incident beam and the normal of the entrance surface, n), $\varphi$ is the angle between the normal and the grating vector $k_G$, and $\lambda_B$ is the wavelength of diffracted light. The light which does not match Bragg condition will pass through the grating without diffraction. This property determines high selectivity of wavelength, wave front and incidence angle of HVG, and large information capacity. Based on these features, the following applications of HVG has been developed: optical correlators, spectroscopy, distributed feedback lasers, fiber Bragg gratings, high density holographic data storage.

Achieving of the Bragg regime of a diffraction grating is usually determined by Klein parameter Q:

$$Q = \frac{2\pi\lambda d}{n\Lambda^2},$$

where d is a thickness of the grating, $\lambda$ is the wavelength of light, $\Lambda$ is the grating period, and n is the refractive index of the recording medium. As a rule, Bragg property is achieved if $Q \gg 1$, typically, $Q \geq 10$. Thus, to meet Bragg condition, thickness of diffraction grating should be higher than some value determined by parameters of grating, recording medium and light. Because of this, HVG is also called Bragg grating and thick grating. On the contrary, the grating with $Q<1$ is usually considered as a thin one, which typically demonstrates many diffraction orders (Raman-Nath diffraction regime).

When the above gratings are recorded in polarization insensitive materials, the resulting gratings are also polarization insensitive. Radically new properties can be achieved when recording gratings in the materials sensitive to polarization of light, which show effect of photoinduced anisotropy. In contrast to the above-mentioned photopolymers sensitive only to the intensity of recording light, these materials are sensitive to both light intensity and polarization. Under action of linearly polarized light, the anisotropic photosensitive units of these materials arrange in some preferential direction, usually perpendicular or parallel to polarization direction of light. This in turn results in optical birefringence and dichroism. Exposing these materials by interference pattern results in periodic orientational patterns having similar features. Noteworthy that despite the highest efficiency of photoalignment for linearly polarized light, this effect can also be observed for partially polarized and elliptically polarized light of a suitable spectrum.

Interference patterns for the case of two collimated beams of polarized light propagating in similar directions are presented in FIG. 1. In case of same linear or circular polarization of the beams, their interference results in intensity patterns while keeping polarization of interfering beams (cases A and B). The gratings recorded by these light patterns are usually called intensity gratings. In case of orthogonal linear polarizations or orthogonal circular polarizations of the beams, intensity modulation does not occur, but light polarization is patterned (cases C and D). These types of patterns do not induce grating in polarization insensitive materials. At the same time, in polarization sensitive materials, the patterns of light polarization induce modulation of optical axis due to photoalignment of anisotropic photosensitive units. The gratings induced by polarization patterns are usually called polarization gratings. Commonly, to create these gratings, geometry D in FIG. 1 is used, which provides pure modulation of linear polarization. These patterns are called cycloidal. Alignment of photosensitive units along or perpendicular to the local polarization of light will create similar orientational configuration which is also called herein cycloidal. The grating holographically inscribed in the layer of polarization sensitive material can be further enhanced by coating layer of liquid crystal (LC) or reactive mesogen as its polymerizable counterpart above the said layer with the recorded grating. LC mimics orientational patterns in the first layer and thus enhances overall thickness of the grating and thus grating efficiency. In the latter case, irradiated layer of polarization sensitive material plays a role of photoalignment layer for LC. This alignment procedure is known as a surface mediated photoalignment.

The polarization-sensitive counterparts of holographic volume gratings, so named polarization volume gratings (PVG) or more generally, polarization volume holograms (PVH), are usually created by the said photoalignment method. In case of chiral nematic LC, uniformly aligned by aligning substrates 210, Grandjean (planar) structure can be achieved, which can operate as an optical grating 200. The fringes of the formed gratings 200 considered as the planes 260 with the same refractive index are parallel to the layer of recordable material, see FIG. 2A. If thickness of LC layer is set high enough and period of grating (half pitch of LC helix) is small, the condition Q≥10 is met and the grating can be considered as a thick one. To realize gratings 201 with slanted fringes 261, chiral nematic LC is usually aligned on the photoaligning layer 211 in which cycloidal patterns are recorded. In this case, tilt of the grating fringes occurs due to superposition of a cycloidal structure imposed by photoalignment layer 211 and a helical structure intrinsic for cholesteric LCs, FIG. 2B. However, preparation procedure of polarization volume gratings based on surface mediated photoalignment of LCs has several shortcomings. First of all, the resulted gratings provide a limited number of alignment patterns and thus a limited set of optical responses. For example, LC molecules align in these gratings parallel to alignment surface so that chirality of LCs is needed to obtain slanted gratings. Furthermore, preparation procedure of these gratings is rather complicated and includes rather long chain of technological steps.

The other method to manufacture PVGs can be based on phenomenon of bulk mediated photoalignment, when photoalignment of photosensitive units occurs in a volume of optically recordable and polarization sensitive material. When irradiation is provided with holographically created polarization patterns of light, the alignment patterns occur immediately in the layer of optically recordable material. To achieve Bragg diffraction typical for volume gratings, this layer should be thick enough to attain Q>>1.

To analyze orientational patterns created by two interfering beams in a real three-dimensional (3D) space, 3D polarization patterns need to be considered, which might be created by these beams. According to theory, interference pattern of polarized light depends on polarization and convergence angle of interfering beams. In case of orthogonal circular polarizations of the beams the best conditions for the patterns of linear polarization are created when angle $\Theta$ between the beams is small ($\Theta \leq 40°$). As the angle $\Theta$ increases, the resultant pattern starts to pick up more and more intensity variation and polarization ellipticity. The system picks up the ellipticity in a quadratic way, meaning it changes rather rapidly from linear to circular when $\Theta$ passes 45°. When the angle further increases, the intensity of circularly polarized light becomes modulated and the highest contrast of this periodic circularly polarized intensity pattern is reached when $\Theta=180°\pm20°$, see FIG. 3A. When circular polarizations of interfering beams are the same, the situation is reversed. In case of small angle between the beams the conditions for high-contrast interference pattern of circular polarization are met, while the case $\Theta=180°\pm20°$ corresponds to highly efficient patterns of linear polarization, FIG. 3B.

Consider now characteristics of polarization patterns. The patterns created by two plane waves of coherent light in two geometries mentioned above are presented in FIG. 4. The following features can be distinguished.

(1) The generated pattern structures are one-dimensional. The lines of same polarization (fringes of light field) are aligned along bisectrix of the angle between the interfering beams. This means that polarization gratings recorded by these light patterns will also be one-dimensional with the same symmetry that distinguishes them from the gratings obtained by surface alignment of liquid crystals, which have more complicated structure and are essentially three-dimensional.

(2) The structure of polarization patterns depends on geometry. In case of a small angle between the beams and their orthogonal polarizations, the light polarization axis rotates around bisectrix of the angle and simultaneously translates in perpendicular direction in the incidence plane of the beams. Since this movement obeys cycloidal law, the corresponding structure is usually called cycloidal. On the other hand, in case the angle between the beams is close to 180°, the light polarization axis rotates around the axis perpendicular to the bisectrix of the angle with translation in the same direction thus creating a helical structure.

Figure 4:
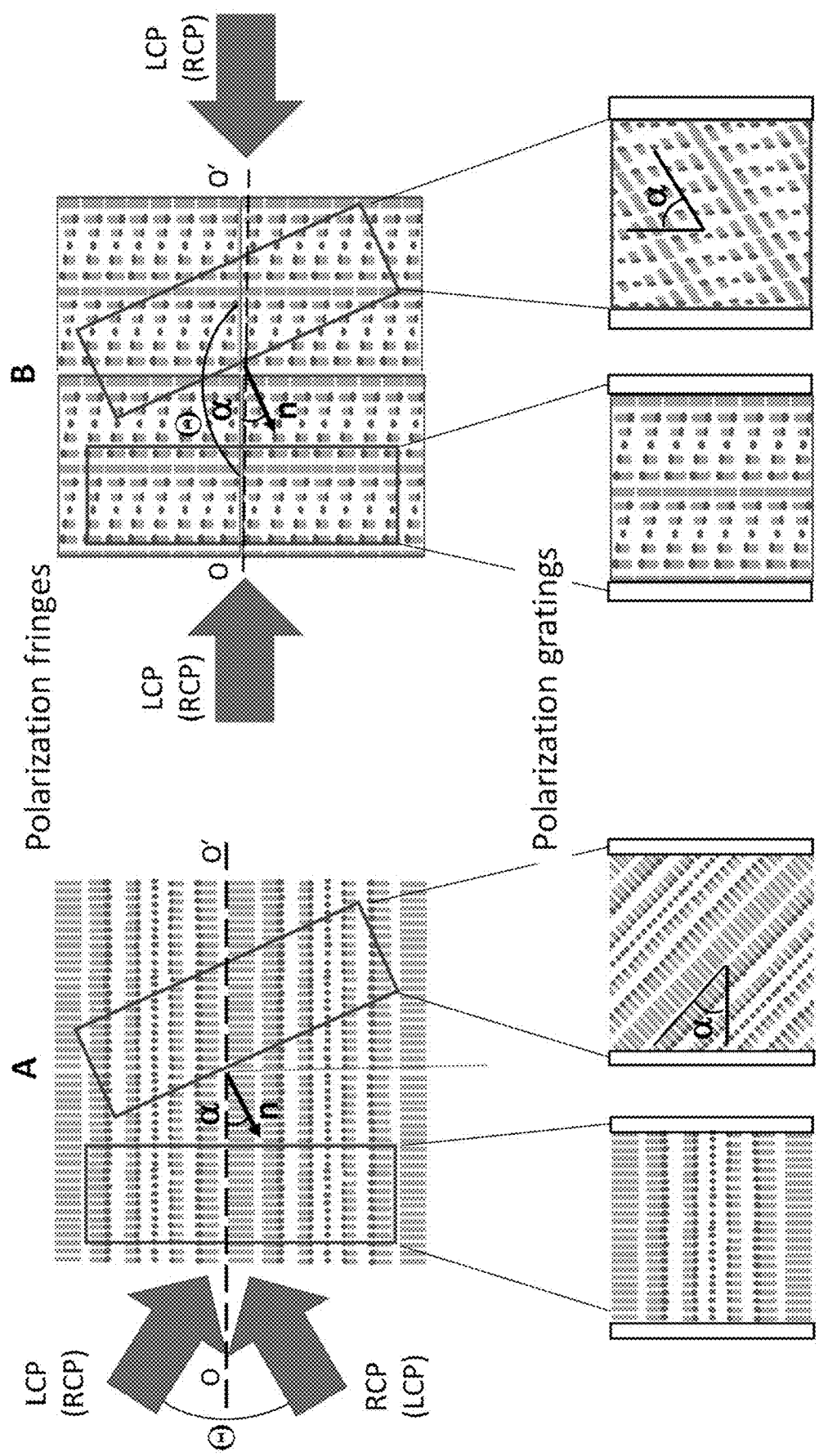
FIG. 4 illustrates patterns of linear polarizations generated by two plane waves of coherent light with circular polarization (upper row) and orientational structures induced in layer of optically recordable polarization sensitive material (bottom row). A: the two plane waves have orthogonal circular polarizations. B: the two plane waves have the same circular polarization.

The layer of optically recordable material placed in intersection area of interfering beams cuts out part of interference pattern, which induce corresponding pattern of polarization grating. FIG. 4 shows that orientation of the grating pattern in the layer depends on orientation of this layer in interference field during recording process and can be characterized by angle $\alpha$ varied in full range 0-360 degrees. It is evident that in contrast to structures created by aligned liquid crystals, which may combine cycloidal and helical order (see FIG. 2B), the structures created by bulk mediated holographic alignment may be either cycloidal or helical. The most efficient photoalignment of photosensitive units occurs in case of patterns of linear polarization, which are created in case of $\Theta \leq 40°$ (orthogonal circular polarizations of recording beams) or $\Theta=180°\pm20°$ (same circular polarization). However, photoalignment effects occur even in case of elliptically polarized light with pronounced ellipticily so that the range of angles $\Theta$ acceptable for creation of orientational patterns in polarization sensitive recordable materials can be essentially broader; it can be considered as $\Theta \leq 90°$ and $\Theta=180°\pm45°$ in case of orthogonal and same polarizations of the recording beams, respectively.

Figure 5A:
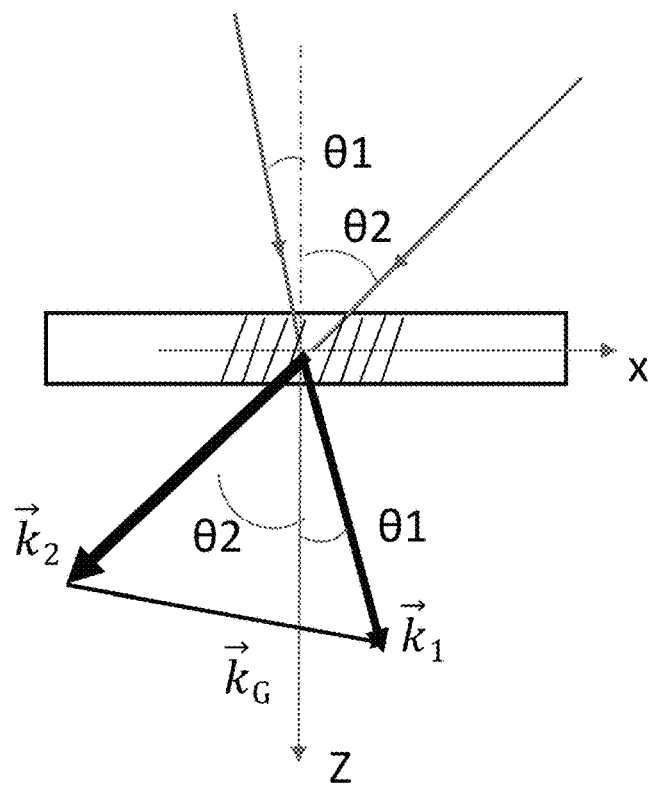
FIG. 5A illustrates geometries for recording polarization volume gratings with beams impinging upon the recording material from the same side.

From practical viewpoint it is usually convenient to associate coordinate system with the recordable layer and consider interference patterns in terms of incident angles of the interfering beams. In this case, grating parameters for different exposure geometries can be estimated based on a theoretical model. For two circularly polarized plane waves with wave vectors $k_1$ and $k_2$ propagating in an xz plane toward the same side of the optically recordable medium and impinge on the surface of this medium under angles $\theta 1$ and $\theta 2$, as shown in FIG. 5A, the interference equations can be described as follows:

$$k_1 = (\sin\theta_1, 0, \cos\theta_1) \quad k_2 = (\sin\theta_2, 0, \cos\theta_2)$$

$$E_{1,local} = (1, i, 0) \quad E_{2,local} = (1, -i, 0) \text{ or } (1, i, 0)$$

$$E_1 = (\cos\theta_1, i, -\sin\theta_1) \quad E_2 = (\cos\theta_2, -i, -\sin\theta_2) \text{ or } (\cos\theta_2, i, -\sin\theta_2)$$

Here $E_{1,local}$ and $E_{2,local}$ are the electric fields of light in the coordinates associated with ray directions $k_1$ and $k_2$, while $E_1$ and $E_2$ are the electric fields represented in global coordinate system associated with holographic layer. The formulas above show that electric field vectors $E_{1,local}$ ($E_1$) and $E_{2,local}$ ($E_2$) depend on handedness of circular polarization. The angles $\theta$ counted from surface normal direction are positive for counterclockwise rotation and negative for clockwise rotation. Then, the total electric field $E_{total}$ and the intensity I can be described with the following equations:

$$E_{total} = E_1 e^{i\frac{2\pi}{\lambda}(x\sin\theta_1 + z\cos\theta_1)} + E_2 e^{i\frac{2\pi}{\lambda}(x\sin\theta_2 + z\cos\theta_2)}$$

$$I = E_1 E_1^* + E_2 E_2^* e^{i\frac{2\pi}{\lambda}[x(\sin\theta_1 - \sin\theta_2) - z(\cos\theta_1 + \cos\theta_2)]} + E_2 E_1^* e^{i\frac{2\pi}{\lambda}[x(-\sin\theta_1 + \sin\theta_2) + z(-\cos\theta_1 + \cos\theta_2)]}$$

where $E_1 E_2^* = E_2 E_1^* =$ $$\mp 1 + \cos\theta_1 \cos\theta_2 + \sin\theta_1 \sin\theta_2 = \mp 1 + \cos(\theta_1 - \theta_2)$$

$$I = E_1 E_1^* + E_2 E_2^* + 2[\cos(\theta_1 - \theta_2) \mp 1]$$
$$\cos\left(\frac{2\pi}{\lambda}[x(\sin\theta_1 - \sin\eta_2) + z(\cos\theta_1 - \cos\theta_2)]\right)$$
$$= 2 + 2 + 2[\cos(\theta_1 - \theta_2) \mp 1]$$
$$\cos\left(\frac{2\pi}{\lambda}[x(\sin\theta_1 - \sin\theta_2) + z(\cos\theta_1 - \cos\theta_2)]\right)$$
$$= 4 + 2[\cos(\theta_1 - \theta_2) \mp 1]$$
$$\cos\left(\frac{2\pi}{\lambda}[x(\sin\theta_1 - \sin\theta_2) + z(\cos\theta_1 - \cos\theta_2)]\right)$$

From these equations, the maximum and minimum intensity, $I_{max}$ and $I_{min}$, and the visibility of the intensity fringes are as follows:

$$I_{min \, or \, max} = 4 + 2\cos(\theta_1 - \theta_2) \mp 2$$

$$I_{max \, or \, min} = 4 - 2\cos(\theta_1 - \theta_2) \pm 2$$

Intensity fringe visibility $$V_{intensity} = \frac{I_{min} - I_{max}}{I_{min} + I_{max}} = \frac{1 \mp \cos(\theta_1 - \theta_2)}{2}$$

The plus sign in the last formula corresponds to same circular polarization of interfering beams, while the minus sign corresponds to the orthogonal circular polarizations of the beams. The parameter $V_{intensity}$ shows how close the induced grating is to the ideal polarization grating ($V_{intensity}=0$) or to the ideal intensity grating ($V_{intensity}=1$).

Figure 5B:
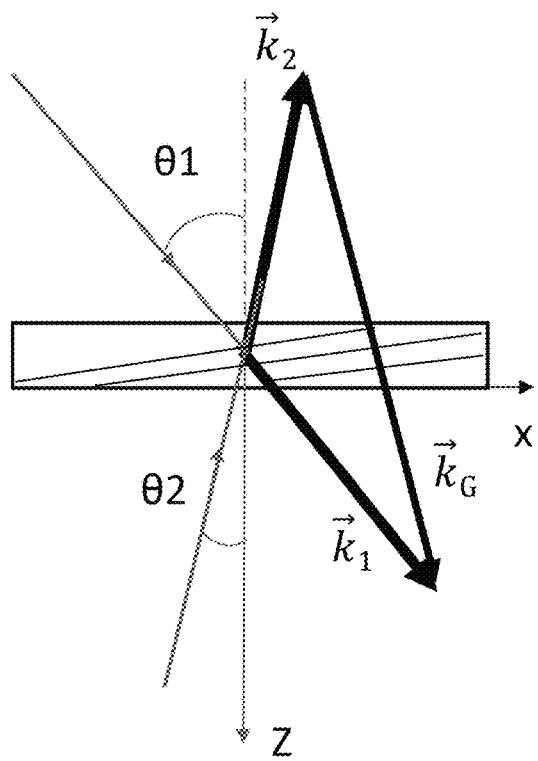
FIG. 5B illustrates geometries for recording polarization volume gratings with beams impinging upon the recording material from opposite sides. $k_1$ and $k_2$ are wave vectors of interfering beams, and $k_G$ is a grating vector.

Despite of unidimensional nature, the slanted gratings of this type show periodicity in both x and z directions associated with the film (FIGS. 5A and 5B). The fringe periods in the x direction and in the z direction, $T_x$ and $T_z$, and the slope angle of fringes $\alpha$ (the angle between the normal of the entrance surface and fringes direction) are as follows:

$$T_x = \left|\frac{\lambda}{\sin\theta_1 - \sin\theta_2}\right|$$

$$T_z = \left|\frac{\lambda}{\cos\theta_1 - \cos\theta_2}\right|$$

$$\tan\alpha = T_x / T_z$$

For example, when $\lambda=360$ nm, $\theta_1=5°$ and angle $\theta_2=-45°$ (FIG. 5C, case B), $T_x=0.46$ μm, $T_z=1.24$ μm, $\alpha=20°$ and $V_{intensity}=0.17$. Since the angle between the interfering beams is relatively large ($\Theta=50°$ the visibility parameter is noticeable. The calculations for $\theta_1=15°$ and angle $\theta_2=45°$ (FIG. 5C, case A) give $T_x=0.8$ μm, $T_z=1.38$ μm, and $V_{intensity}=0.07$ are generated. The inclination angle of the fringes is ~30°. The low value of $V_{intensity}$ means that interference fringes are almost ideal polarization patterns. This agrees well with relatively small angle between the beams $\Theta=30°$.

Figure 5C:
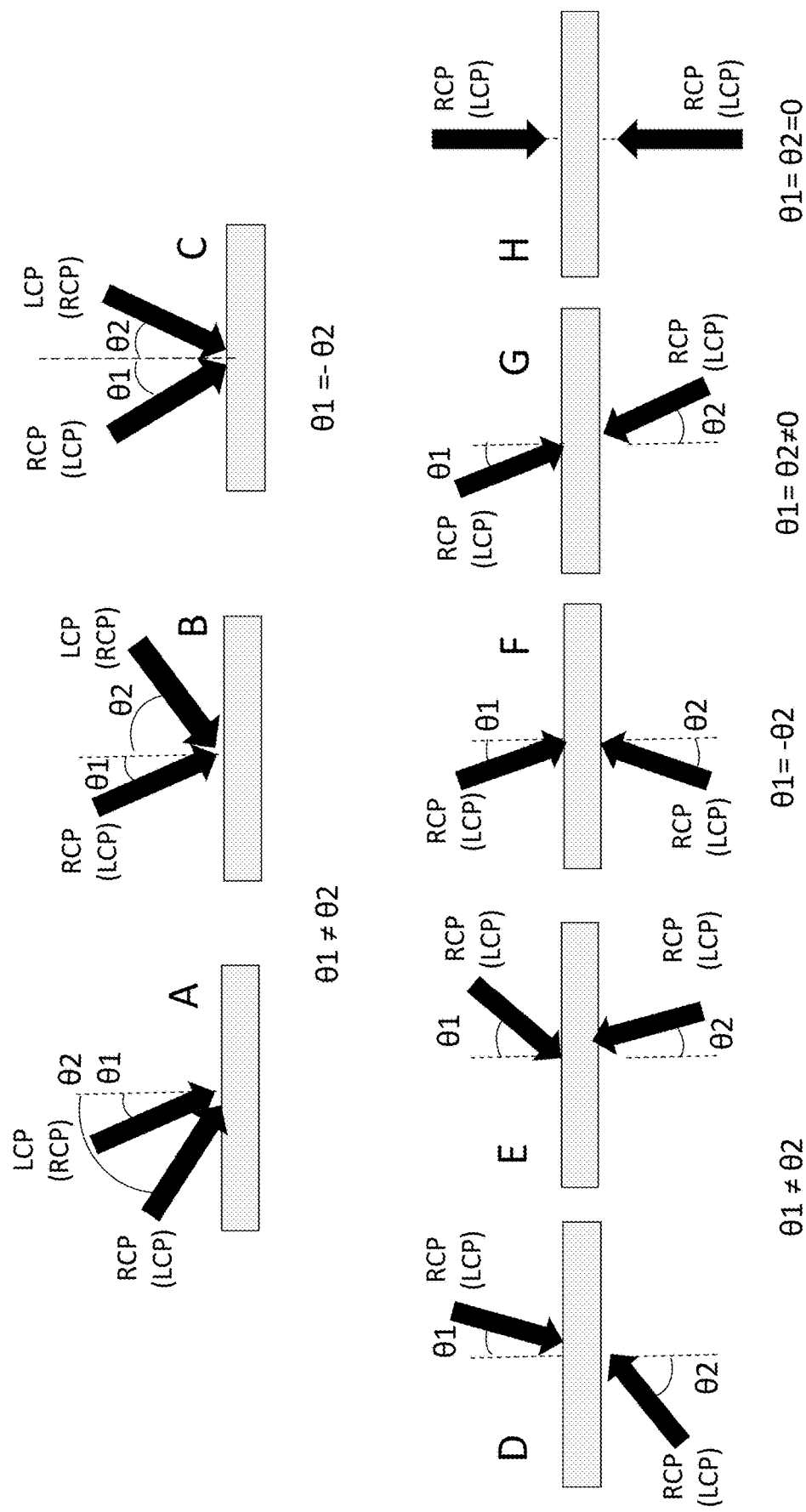
FIG. 5C illustrates example geometries for recording polarization volume gratings with two beams.

When $\theta_1=-\theta_2$, as shown by FIG. 5C, case C, $T_x$, $T_z$, and $V_{intensity}$ are as follows:

$$T_x = \lambda / 2\sin\theta$$

$$T_z \to \infty$$

$$V_{intensity} = 0$$

$$\alpha = 0.$$

Thus, a polarization grating with a grating vector in the x-direction is formed (e.g., the fringes are perpendicular to the surface of the optically recordable medium).

For two beams propagating in an xz plane toward the opposite sides of the optically recordable medium and impinging the opposite surfaces of the recording medium under angles $\theta_1$ and $\theta_2$ as shown in FIG. 3B, the visibility parameter is as follows:

$$V_{intensity} = \frac{1 \pm \cos(\theta_1 - \theta_2)}{2}$$

The plus sign in this formula corresponds to orthogonal circular polarizations of interfering beams, while the minus sign corresponds to the same circular polarizations of the beams. Same as above, the parameter $V_{intensity}$ shows how close the induced grating is to the ideal intensity grating ($V_{intensity}=1$) or ideal polarization grating ($V_{intensity}=0$).

The fringe periods in the x direction and in the z direction, $T_x$ and $T_z$, and the slope angle of fringes $\alpha$ are as follows:

$$T_x = \left|\frac{\lambda}{\sin\theta_1 - \sin\theta_2}\right|$$

$$T_z = \left|\frac{\lambda}{\cos\theta_1 - \cos\theta_2}\right|$$

$$\tan\alpha = T_z / T_x$$

For example, when light having a wavelength $\lambda$ of 360 nm impinges on optically recordable medium at angle $\theta_1=5°$ and angle $\theta_2=30°$, fringes having $T_x=0.61$ μm, $T_z=0.19$ μm, $V_{intensity}=0.05$ and $\alpha=17°$ are generated. This means that practically pure polarization helical patterns are induced, which may induce similar orientational patterns in optically responding material.

When light having a wavelength $\lambda$ of 360 nm impinges on optically recordable medium at angle $\theta_1=-30°$ and angle $\theta_2$=10 (FIG. 5C, case E), fringes having $T_x$=1.1 μm, $T_z$=0.24 μm, α=12° and $V_{intensity}$=0.11 are generated.

When $\theta_1$=−$\theta_2$ (|$\theta_1$β|=|$\theta_2$|=0), as shown in FIG. 5C, case F, $T_x$, $T_z$, and $V_{intensity}$ are as follows:

$T_x \to \infty$ $T_z = \lambda/2 \cos\theta$ $V_{intensity} = (1-\cos 2\theta)/2$ When $\theta_1$ and $\theta_2$ are small, $V_{intensity}$ can be approximated as 0°.

Thus, helical polarization pattern with the helical axis oriented in z direction are formed. These light patterns induce similar orientational patterns in the optically recordable medium, e.g., polarization sensitive polymer. If for example $\theta_1$=15° and $\theta_2$=−15° then $T_z$=0.19 μm and $V_{intensity}$=0.07.

When first light beam and second light beam counter-propagate to each other (e.g., first light beam and second light beam are parallel to each other and propagate in opposite directions) and when $\theta_1$=$\theta_2$≠0 (FIG. 5C, case G), the grating fringes are tilted relative to the surface of the optically recordable medium and $T_x$, $T_z$, and $V_{intensity}$ are as follows:

$$T_x = \left|\frac{\lambda}{2\sin\theta}\right|$$

$$T_z = \left|\frac{\lambda}{2\cos\theta}\right|$$

$$V_{intensity} = 0$$

When, for example, $\theta_1$=$\theta_2$=45°, then $T_x$=255 nm and $T_z$=255 nm, α=45°.

When $\theta_1$=$\theta_2$=0 (FIG. 5C, case H), $T_x$, $T_z$, and $V_{intensity}$ are as follows:

$T_x \to \infty$ $T_z = \lambda/2$ $V_{intensity} = 0$

Thus, a polarization grating with a grating vector in the z-direction is formed (e.g., the fringes are parallel to the surface of the optically recordable medium).

Figure 6A:
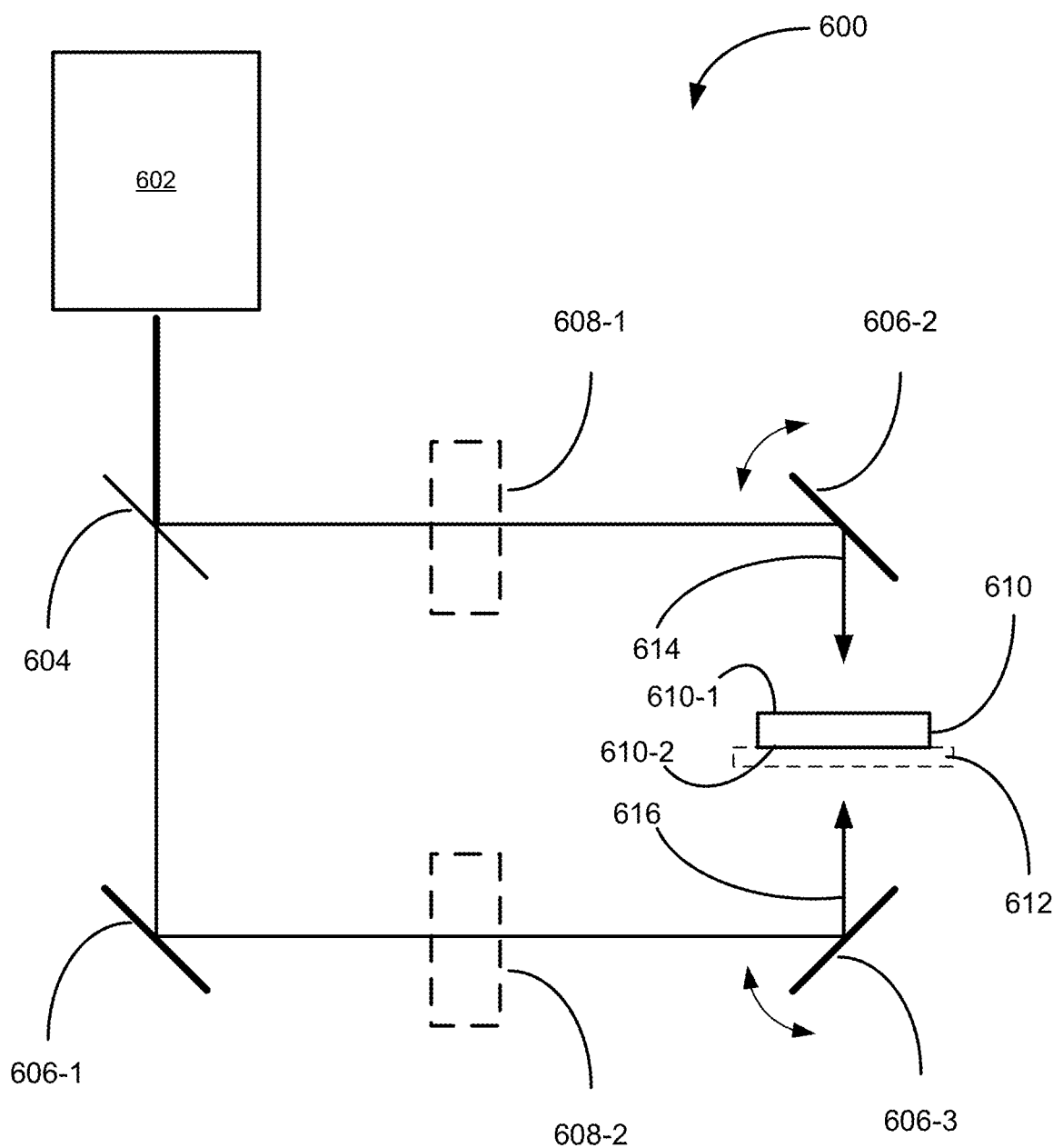
FIG. 6A illustrates exemplary optical setup for making a polarization volume holographic element with two beams impinging on opposite sides of an optically recordable medium.

FIG. 6A illustrates exemplary optical setup 600 for making a polarization volume holographic element in accordance with some embodiments (e.g., in accordance with exposure geometry shown in FIG. 5B).

Optical setup 600 includes light source 602 configured to emit light and beam splitter 604 configured to spatially separate light received by beam splitter 604. For example, when light emitted by light source 602 has a mixed polarization, in some cases, beam splitter 604 separates the received light into two directions (e.g., beam splitter 604 reflects first light 614 having a first polarization and transmits second light 616 having a second polarization). In some embodiments, light source 602 is configured to emit coherent light (e.g., light source 602 is a laser).

In some embodiments, optical setup 600 includes one or more polarization elements 608-1 and 608-2. For example, optical setup 600 may include polarization element 608-1 without polarization element 608-2, may include polarization element 608-2 without polarization element 608-1, or may include both polarization elements 608-1 and 608-2. In some embodiments, polarization element 608-1, when included, is configured to change the polarization of first light 614 (e.g., converts a linearly polarized light to a circularly polarized light and/or change a phase of a circularly polarized light). In some embodiments, polarization element 608-2, when included, is configured to change the polarization of second light 616 (e.g., converts a linearly polarized light to a circularly polarized light and/or change a phase of a circularly polarized light). In some embodiments, at least one of the one or more polarization elements 608-1 and 608-2 is a half-wave plate.

In some embodiments, optical setup 600 includes one or more mirrors 606 (e.g., mirrors 606-1, 606-2, and 606-3) configured to reflect light. One or more mirrors 606 are used to steer various light used with optical setup 600 (e.g., first light 614 and second light 616). In some embodiments, at least a subset of one or more mirrors 606 is tiltable (e.g., mirror 606-2 is at least partially rotatable so that an incident angle of first light 614 on mirror 606-2 can be changed without changing the direction of first light 614 before impinging on mirror 606-2; similarly, mirror 606-3 is at least partially rotatable so that an incident angle of first light 616 on mirror 606-3 can be changed without changing the direction of first light 616 before impinging on mirror 606-3).

As shown in FIG. 6A, optical setup 600 is configured to illuminate optically recordable medium 610 with first light 614 and second light 616. In FIG. 6A, first light 614 illuminates optically recordable medium 610 from first surface 610-1 (e.g., a planar surface) of optically recordable medium 610 and second light 616 illuminates optically recordable medium 610 from second surface 610-2 (e.g., a planar surface) of optically recordable medium 610 that is opposite to first surface 610-1 of optically recordable medium 610.

In some embodiments, optically recordable medium 610 is positioned on (or over) mount 612. In some embodiments, mount 612 is transparent to at least second light 616.

In some embodiments, prior to impinging on optically recordable medium 610, first light 614 and second light 616 have a same polarization. For example, first light 614 is a left-handed circularly polarized light and second light 616 is also a left-handed circularly polarized light, or first light 614 is a right-handed circularly polarized light and second light 616 is also a right-handed circularly polarized light.

As shown in FIG. 6A, optical setup 600 allows concurrent illumination of optically recordable medium 610 with cross-propagating first light 614 and second light 616. The concurrent illumination with cross-propagating first light 614 and second light 616 causes interference of first light 614 and second light 616, which generates holographic patterns in optically recordable medium 610. By adjusting the directions of first light 614 and/or second light 616, different holographic patterns can be recorded in optically recordable medium 610. When holographic patterns generated by optical setup 600 are recorded in optically recordable medium 610, optically recordable medium 610 typically operates as a reflective holographic polarization volume grating.

Figure 6B:
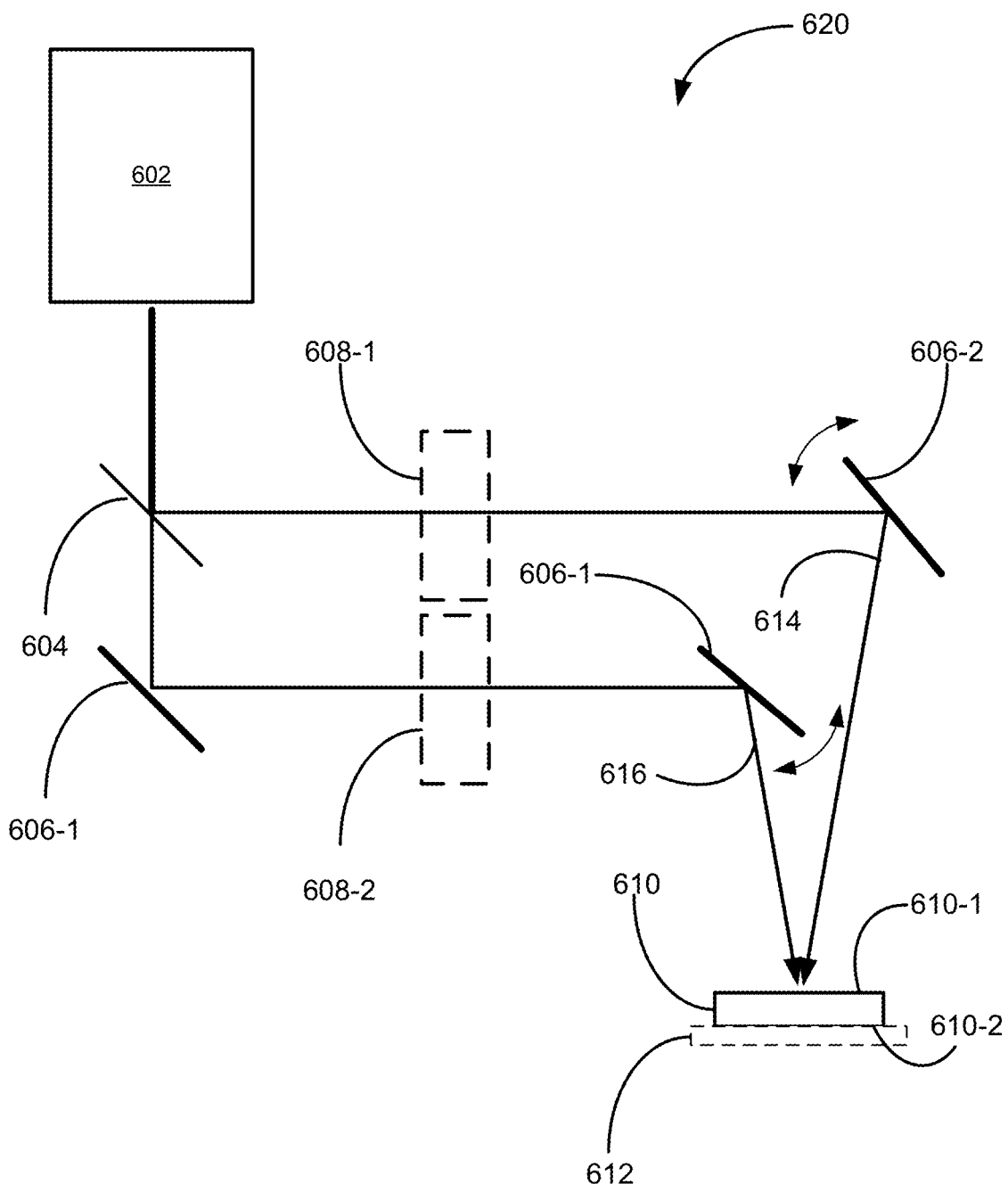
FIG. 6B illustrates exemplary optical setup for making a polarization volume holographic element with two beams impinging on a same side of an optically recordable medium.

FIG. 6B illustrates exemplary optical setup 620 for making a polarization volume holographic element in accordance with some embodiments (e.g., in accordance with exposure geometry shown in FIG. 5A).

Optical setup 620 shown in FIG. 6B is similar to optical setup 600 shown in FIG. 6A, except that first light 614 and second light 616 illuminate first surface 610-1 of optically recordable medium 610.

When holographic patterns generated by optical setup 620 are recorded in optically recordable medium 610, optically recordable medium 610 typically operates as a transmissive holographic polarization volume grating.

In some embodiments, prior to impinging on optically recordable medium 610, first light 614 and second light 616 have orthogonal polarizations. For example, first light 614 is a left-handed circularly polarized light and second light 616 is a right-handed circularly polarized light, or first light 614 is a right-handed circularly polarized light and second light 616 is a left-handed circularly polarized light.

Figure 7:
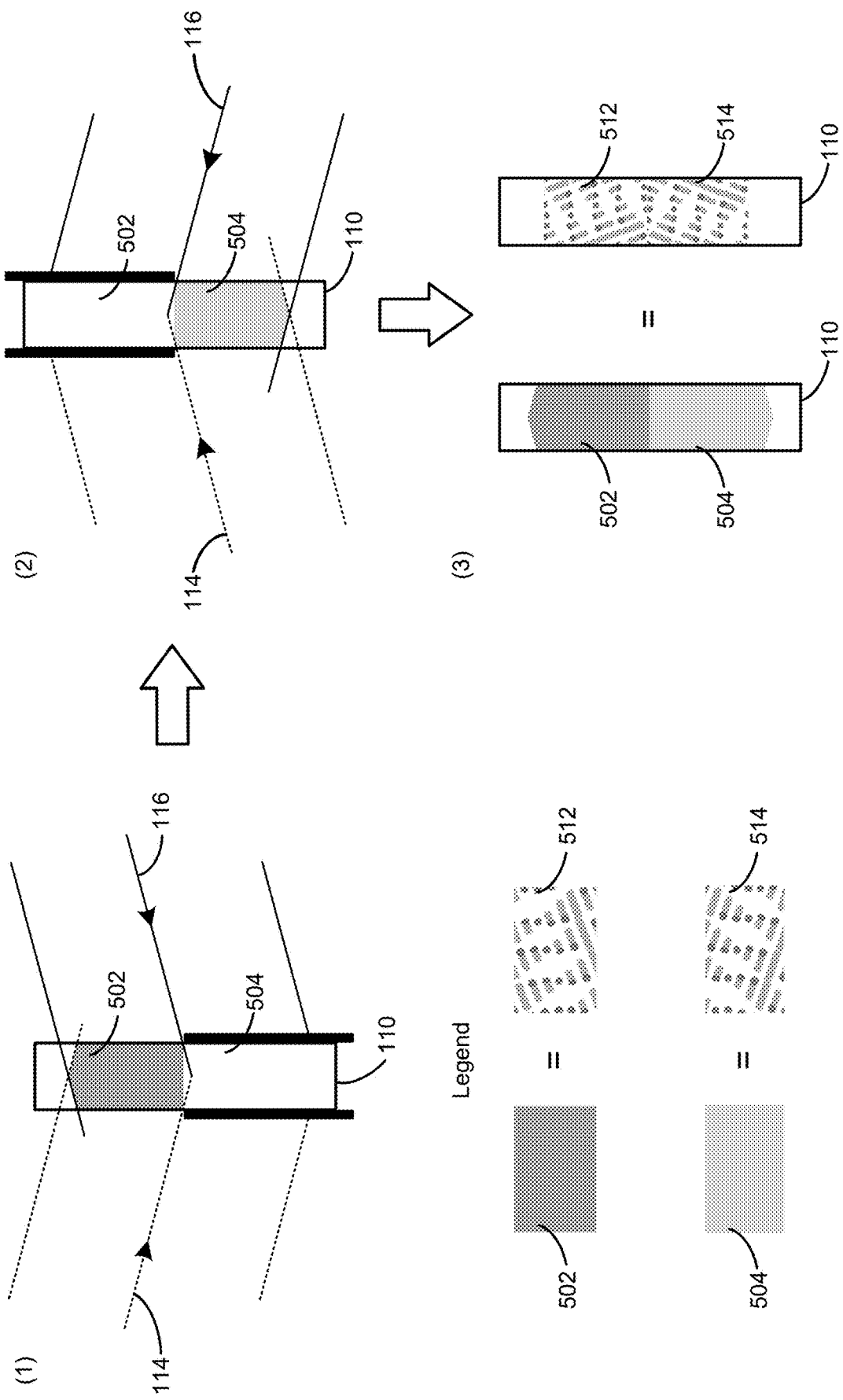
FIG. 7 illustrates making an optical element by sectionally illuminating an optically recordable medium in accordance with some embodiments.

FIG. 7 illustrates making an optical element by sectionally illuminating an optically recordable medium in accordance with some embodiments.

FIG. 7 shows that, at a first time, second portion 504 of optically recordable medium 110 is masked so that first light 114 and second light 116 illuminate first portion 502 of optically recordable medium 110 at a first set of angles without illuminating second portion 504 of optically recordable medium 110. As a result, polymers in first portion 502 of optically recordable medium 110 have a first pattern (e.g., helical structures 512 that correspond to a grating with a grating vector in a first direction).

FIG. 7 also shows that, at a second time different from the first time (e.g., the second time is subsequent to the first time), first portion 502 of optically recordable medium 110 is masked so that first light 114 and second light 116 illuminate second portion 504 of optically recordable medium 110 at a second set of angles different from the first set of angles (e.g., by changing the direction of first light 114 and/or the direction of second light 116 between the first time and the second time) without illuminating first portion 502 of optically recordable medium 110. As a result, polymers in second portion 504 of optically recordable medium 110 have a second pattern that is distinct from the first pattern (e.g., helical structures 514 that correspond to a grating with a grating vector in a second direction).

As a result, optically recordable medium 110 includes at least two portions with distinct optical properties.

In some embodiments, masking a portion of optically recordable medium 110 includes masking a first surface of optically recordable medium 110 without masking a second surface of optically recordable medium 110 that is opposite to the first surface of optically recordable medium 110. In some embodiments, masking a portion of optically recordable medium 110 includes masking the second surface of optically recordable medium 110 without masking the first surface of optically recordable medium 110. In some embodiments, masking a portion of optically recordable medium 110 includes masking both the first surface of optically recordable medium 110 and the second surface of optically recordable medium 110.

Figure 8:
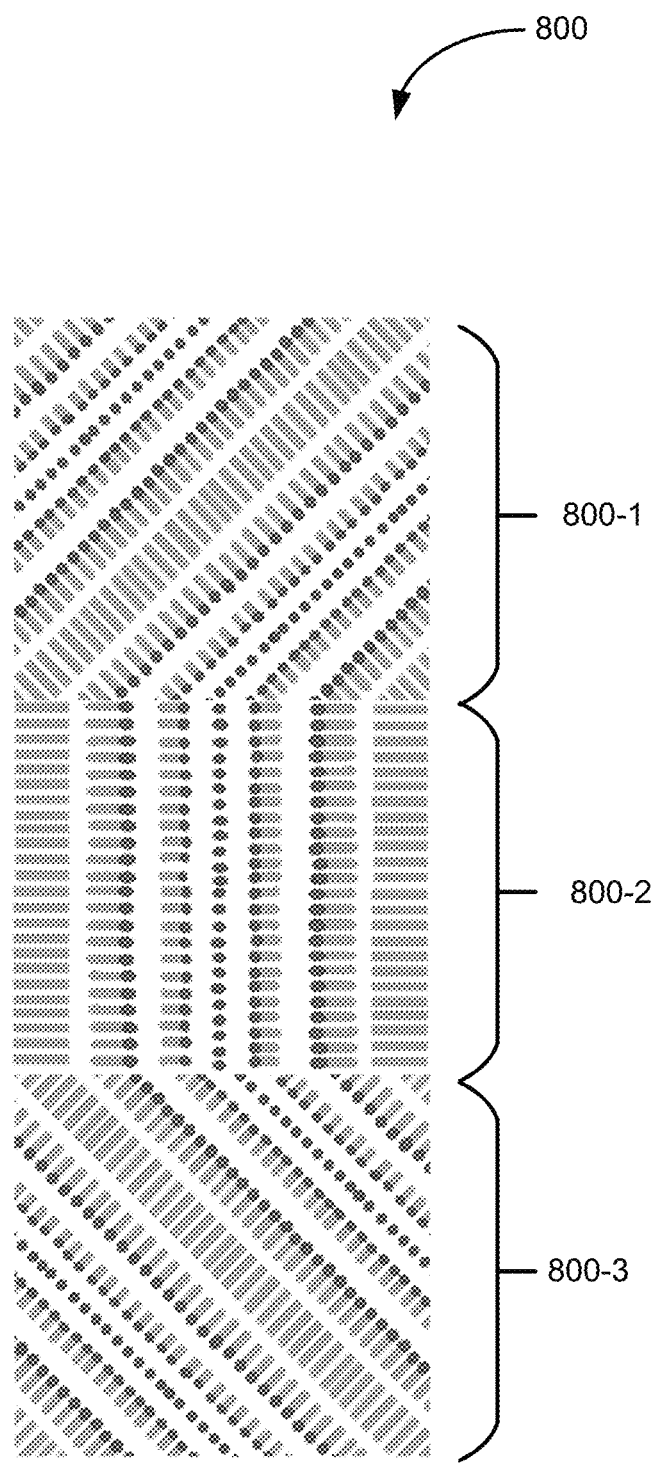
FIG. 8 illustrates a polarization volume holographic element including multiple layers of optically recordable material with different alignment patterns.

FIG. 8 illustrates polarization volume holographic element 800 in accordance with some embodiments. Polarization volume holographic element 800 shown in FIG. 8 includes three regions, namely first region 800-1, second region 800-2, and third region 800-3. In some embodiments, polarization volume holographic element 800 is formed by stacking first region 800-1, second region 800-2, and third region 800-3. In some embodiments, polymers in first region 800-1 are oriented in directions distinct from polymers in second region 800-2 and polymers in third region 800-3. Polymers in second region 800-2 are oriented in directions distinct from polymers in third region 800-3. For example, as shown in FIG. 8, polymers in first region 800-1 are arranged in cycloidal patterns along a first plane, polymers in second region 800-2 are arranged in cycloidal patterns along a second plane that is not parallel to the first plane, and polymers in third region 800-3 are arranged in cycloidal patterns along a third plane that is not parallel to the first plane and the second plane.

Figure 9:
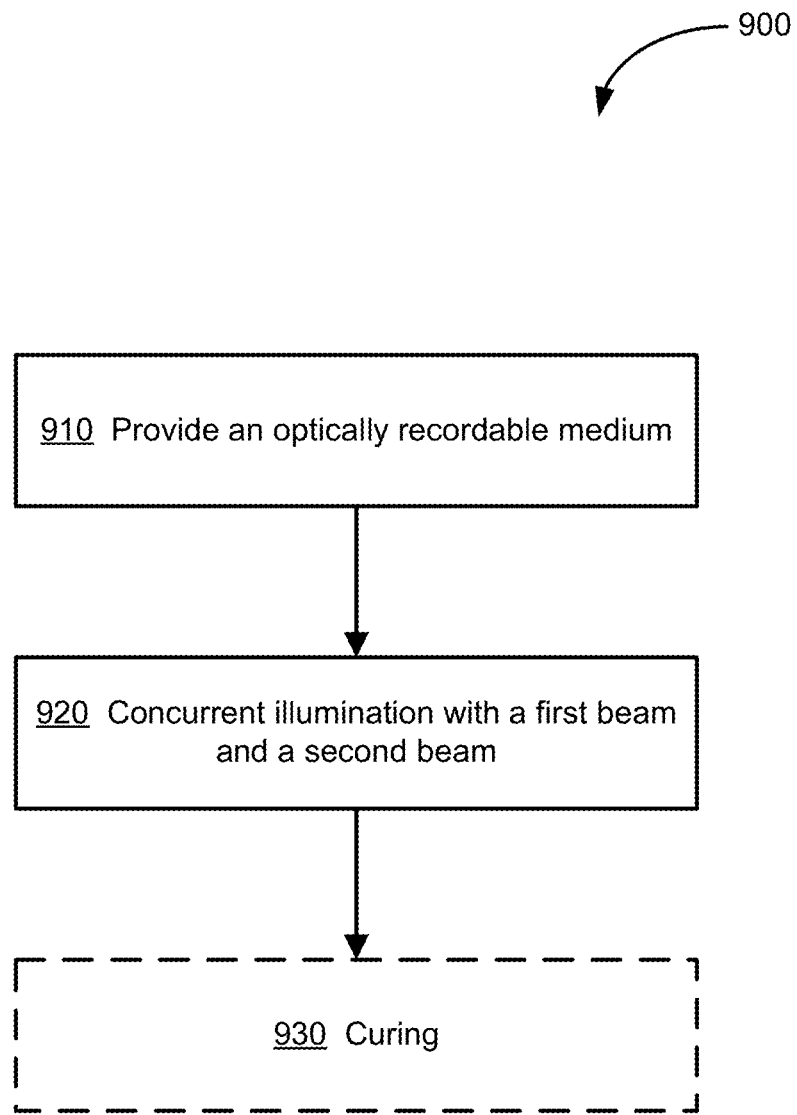
FIG. 9 illustrates a method of making a polarization volume holographic element in accordance with some embodiments.

FIG. 9 illustrates method 900 of making a polarization volume holographic element in accordance with some embodiments.

The method includes providing (910) an optically recordable medium having the Klein parameter Q that is greater than, or equal to, a predefined criterion (e.g., Q is greater than 10). The optically recordable medium has a first surface and a second surface that is opposite to the first surface.

In some embodiments, the Klein parameter Q is greater than, or equal to 5. In some embodiments, the Klein parameter Q is greater than, or equal to 10. In some embodiments, the Klein parameter Q is greater than, or equal to 15. In some embodiments, the Klein parameter Q is greater than, or equal to 20. In some embodiments, the Klein parameter Q is greater than, or equal to 25. In some embodiments, the Klein parameter Q is greater than, or equal to 30. In some embodiments, the Klein parameter Q is greater than, or equal to 35. In some embodiments, the Klein parameter Q is greater than, or equal to 40. In some embodiments, the Klein parameter Q is greater than, or equal to 45. In some embodiments, the Klein parameter Q is greater than, or equal to 50. In some embodiments, the Klein parameter Q is greater than, or equal to 60. In some embodiments, the Klein parameter Q is greater than, or equal to 70. In some embodiments, the Klein parameter Q is greater than, or equal to 80. In some embodiments, the Klein parameter Q is greater than, or equal to 90. In some embodiments, the Klein parameter Q is greater than, or equal to 100. In some embodiments, the Klein parameter Q is greater than, or equal to 200.

In some embodiments, the optically recordable medium includes photopolymers and/or liquid crystal polymers.

The PVGs based on bulk mediated photoalignment were induced in azopolymers. However, these materials absorb visible light so that orientational patterns are optically unstable. Our invention extends the range of recording media to the class of photocrosslinking materials. Besides, it extends a plurality of orientational patterns generated by polarization patterns created by two interfering light beams.

In some embodiments, the optically recordable medium includes less than 10% of azo polymers by weight. Although azo polymers may be used as photopolymers, azo polymers have significant absorption, which in turn interferes with the use of the optical elements as see-through components in displays. In some embodiments, the optically recordable medium includes little or no azo polymers. For example, in some cases, the optically recordable medium includes less than 9%, 8%, 7%, 6%, 5%, 4%, 3%, 2%, 1%, 0.5% or 0.1% of azo polymers by weight. The optically recordable photocrosslinking materials may also include other additives, such as photosensitizers, photoinitiators, crosslinkers, reactive mesogens, etc.

The method also includes concurrently illuminating (920) the optically recordable medium (i) with a first beam having a first polarization and (ii) with a second beam having a second polarization, thereby obtaining the polarization volume holographic element.

In some embodiments, the first beam and the second beam have the same wavelength (e.g., the wavelength of the first beam and the second beam is 325 nm or 360 nm).

In some embodiments, the first beam has plane wave front and the second beam has plane wave front.

In some embodiments, the first beam has plane wave front and the second beam has spherical wave front.

In some embodiments, the first beam has spherical wave front and the second beam has spherical wave front.

In some embodiments, the first polarization corresponds to left-handed circular polarization and the second polarization corresponds to left-handed circular polarization. In some embodiments, the first polarization corresponds to right-handed circular polarization and the second polarization corresponds to right-handed circular polarization.

In some embodiments, the first polarization corresponds to left-handed circular polarization and the second polarization corresponds to right-handed circular polarization. In some embodiments, the first polarization corresponds to right-handed circular polarization and the second polarization corresponds to left-handed circular polarization.

In some embodiments, the first beam and the second beam have slightly elliptical polarization close to circular polarization.

In some embodiments, the first polarization corresponds to a first linear polarization (e.g., horizontal polarization) and the second polarization corresponds to a second linear polarization (e.g., vertical polarization) orthogonal to the first linear polarization.

In some embodiments, recording beams have orthogonal circular polarizations and the angle between the beams is less than 90 degrees, preferably less than 60 degrees, most preferably less than 40 degrees so that the formed polarization patterns are cycloidal patterns (FIG. 4, section A).

In some embodiments, recording beams have same circular polarizations and angle between the beams is 180±45 degrees, preferably 180±30 degrees, most preferably 180±20 degrees so that the formed polarization patterns are helical patterns (FIG. 4, section B).

In some embodiments, the optically recordable medium is concurrently illuminated with the first beam and the second beam through the same surface of the optically recordable medium.

In some embodiments, the optically recordable medium is concurrently illuminated with the first beam through the first surface of the optically recordable medium and the second beam through the second surface of the optically recordable medium (e.g., the first beam and the second beam illuminate opposite sides of the optically recordable medium).

In some embodiments, an incidence angle of the first beam and an incidence angle of the second beam on the layer of recordable material are equal in value and sign.

In some embodiments, the incidence angle of the first beam and the incidence angle of the second beam on the layer of recordable material are equal in value and non-equal in sign.

In some embodiments, the incidence angle of the first beam and the incidence angle of the second beam on the layer of recordable material are equal in sign and non-equal in value.

In some embodiments, the incidence angle of the first beam and the incidence angle of the second beam on the layer of recordable material are non-equal in sign and non-equal in value.

In some embodiments, the first incidence angle is zero and the second incidence angle is zero.

In some embodiments, intensity fringes formed by concurrently illuminating the optically recordable medium with the first beam and the second beam have intensity variation below a predefined threshold (e.g., $V_{intensity}$ below a predefined threshold, such as V≤0.25, for intensity fringes formed by concurrently illuminating the optically recordable medium).

In some embodiments, the method includes (930) curing the optically recordable medium after concurrently illuminating the optically recordable medium with the first beam and the second beam. In some embodiments, the curing includes thermal annealing. In some embodiments, the curing includes exposing the optically recordable medium to ultraviolet light.

In some embodiments, the first surface of the optically recordable medium is substantially flat and the second surface of the optically recordable medium is substantially flat.

In some embodiment, fringes of formed volume polarization gratings are perpendicular to the layer of optically recordable material.

In some embodiment, fringes of formed volume polarization gratings are parallel to the layer of optically recordable material.

In some embodiment, fringes of formed volume polarization gratings are tilted to the plane of layer of optically recordable material (slanted grating).

In some embodiments, periodic orientational patterns formed in optically recordable material under holographic exposure are cycloidal patterns.

In some embodiments, periodic orientational patterns formed in optically recordable material under holographic exposure are helical patterns.

Figure 2A:
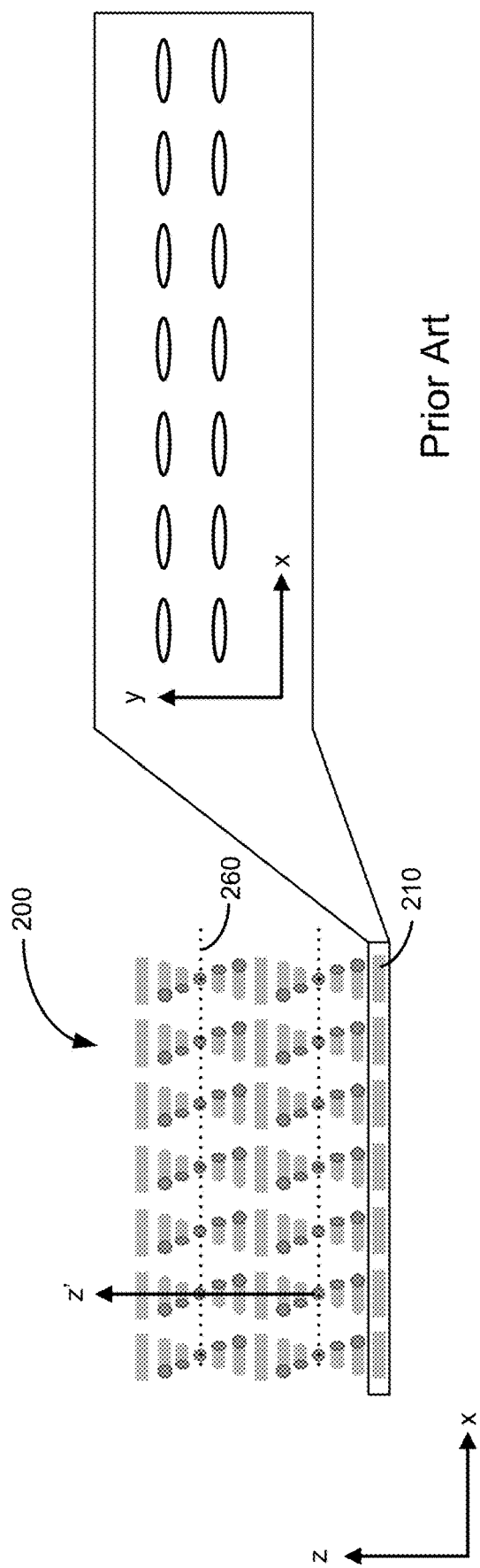
FIG. 2A illustrates a non-slanted polarization volume grating obtained by alignment of liquid crystal with a photoaligning layer.
Figure 2B:
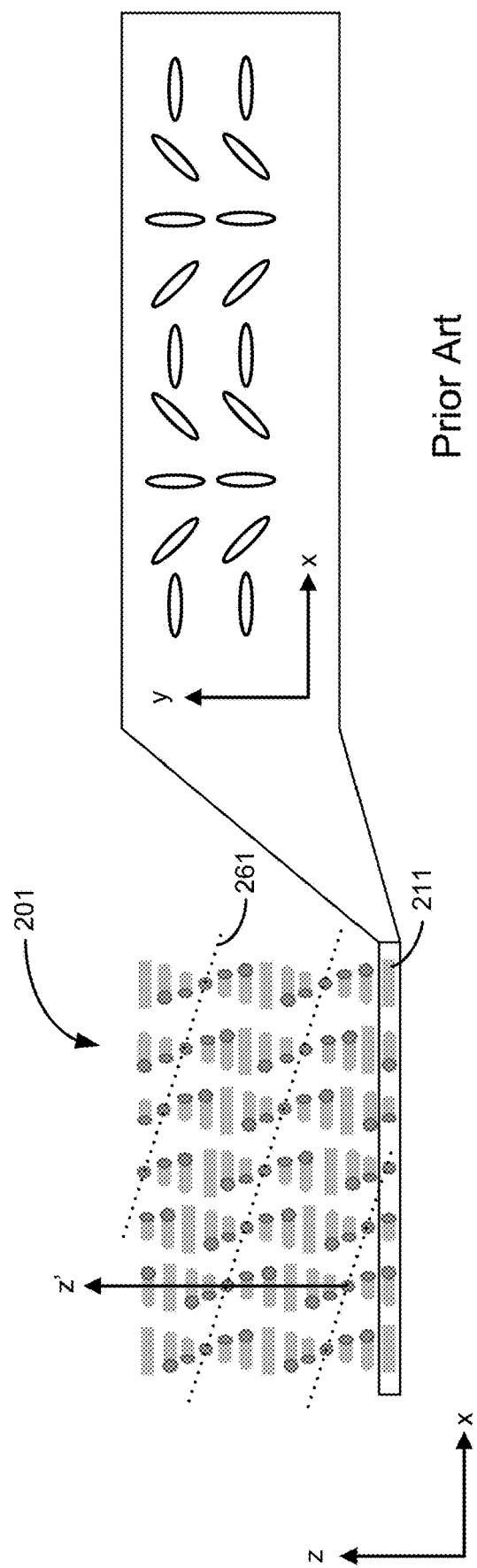
FIG. 2B illustrates a slanted polarization volume grating obtained by alignment of liquid crystal with a photoaligning layer with holographically induced cycloidal alignment patterns.

In some embodiments, the polarization volume holographic element does not include a photoalignment layer (e.g., compare the optical elements that include alignment layers as shown in FIGS. 2A and 2B).

In some embodiments, the periodic orientational patterns include variation in the orientation of the optically recordable material along each axis of the Cartesian coordinate system, where one axis of the Cartesian coordinate system is perpendicular to the first surface. For example, the polarization gratings shown in FIG. 4, where a is between 0° and 90° (not including 0° and 90°), have variation in the orientation of the optically recordable material in all three Cartesian coordinate system where one axis of the Cartesian coordinate system is perpendicular to one of the surfaces of the optically recordable material. This is different from the optical elements formed by using alignment layers, as shown in FIGS. 2A and 2B.

In accordance with some embodiments, a polarization volume holographic element includes a first optical medium that satisfies the condition Q≥10.

In some embodiments, the layer of optically recordable medium is at a first time concurrently illuminated with first and second coherent beams in first exposure geometry thereby recording first grating, and then at a second time concurrently illuminated with the third and the fourth coherent beams in second exposure geometry thereby recording the second grating. The wavelength of third and fourth coherent beams used in second exposure step can be different from wavelength of first and second coherent beams used in first exposure step. This process is usually called grating multiplexing.

In some embodiments, the first portion of the optically recordable medium is concurrently illuminated in first exposure geometry with first and the second coherent beams while the second portion of the optically recordable medium is masked (and the first portion of the optically recordable medium is not masked), and the second portion of the optically recordable medium is concurrently illuminated in second exposure geometry with third and fourth coherent beams while the first portion of the optically recordable medium is masked (and the second portion of the optically recordable medium is not masked) (e.g., FIG. 7). The wavelength of the third and fourth coherent beams used in second exposure step can be different from wavelength of the first and second coherent beams used in first exposure step. By this way multidomain gratings can be attained.

The layer of first optical medium includes photosensitive components (e.g., fragments of polymer molecules) arranged in a first plurality of orientational patterns and the layer of second optical medium adjacent to the first layer includes photosensitive components arranged in a second plurality of orientational patterns. A first layer with a first plurality of orientational patterns is positioned in a first direction on a reference plane and a second layer with a second plurality of orientational patterns is positioned in a second direction distinct from the first direction on the reference plane. This process is usually called stacking of holographic gratings.

In some embodiments, the volume holographic element includes a layer of third optical medium. In some embodiments, each optical medium is illuminated with two beams as described herein and stacked together to form a stacked hologram (FIG. 8). In some embodiments, first optical medium is illuminated and cured, and the second optical medium is added, illuminated and cured on top of the first optical medium. In some embodiments, the polarization volume holographic medium with multiple optical mediums is prepared with a single illumination.

In some embodiments, the first plurality of periodical orientational patterns has a first period and the second plurality of periodical orientational patterns has a second period. The first optical medium is configured to diffract light of a first wavelength and transmit light of wavelengths other than the first wavelength, and the second optical medium is configured to diffract light of a second wavelength distinct from the first wavelength and transmit light of wavelengths other than the second wavelength. In some embodiments, the first wavelength corresponds to red light and the second wavelength corresponds to green light. In some embodiments, the first wavelength corresponds to red light and the second wavelength corresponds to blue light. In some embodiments, the first wavelength corresponds to blue light and the second wavelength corresponds to green light. In some embodiments, the first wavelength corresponds to visible light and the second wavelength corresponds to infrared light.

In some embodiments, the stack of polarization volume holograms prepared according to methods described herein includes one or more art holograms based on aligned liquid crystal layer as shown in FIGS. 2A and 2B.

In accordance with some embodiments, a polarization volume holographic element is made by any method described herein.

Although some of various drawings illustrate a number of logical stages in a particular order, stages which are not order dependent may be reordered and other stages may be combined or broken out. While some reordering or other groupings are specifically mentioned, others will be apparent to those of ordinary skill in the art, so the ordering and groupings presented herein are not an exhaustive list of alternatives. Moreover, it should be recognized that the stages could be implemented in hardware, firmware, software or any combination thereof.

The foregoing description, for purpose of explanation, has been described with reference to specific embodiments. However, the illustrative discussions above are not intended to be exhaustive or to limit the scope of the claims to the precise forms disclosed. Many modifications and variations are possible in view of the above teachings. For example, although the simple orientational structures produced by two interfering plane waves are used as described, the holograms can be induced by waves with fronts of spherical and other shapes. In addition, orientational patterns and corresponding volume gratings can be produced by the interfering waves of elliptical polarization. Also, other orientational periodic structures and corresponding volume gratings in specified materials can be induced by interference patterns produced by two beams of linearly polarized light. The embodiments were chosen in order to best explain the principles underlying the claims and their practical applications, to thereby enable others skilled in the art to best use the embodiments with various modifications as are suited to the particular uses contemplated. However, such modifications and variations are within the scope of claims described herein.

As used herein, the term "exemplary" is used to refer to an example, instance, or illustration, and does not necessarily indicate that any such exemplary embodiment is better or worse than any other embodiments.

Some embodiments may be described with reference to the following clauses:

Clause 1: A method of creating orientational patterns in a bulk of photosensitive materials comprises providing a layer of optically recordable polarization sensitive and photocrosslinkable material having a thickness that is greater than, or equal to, a predefined thickness, a first surface and a second surface that is opposite to the first surface; and concurrently illuminating the layer of optically recordable material with two coherent beams of polarized light thereby inducing periodic orientational patterns.

Clause 2: The method of clause 1, wherein the beams are circularly polarized.

Clause 3: The method of clause 2, wherein convergence angle of the beams is less than 90°, preferably less than 60° and most preferably less than 40°, and the beams have orthogonal circular polarizations thereby inducing cycloidal orientational patterns in the layer of optically recordable material.

Clause 4: The method of clause 3, wherein the beams impinge on the same surface of the layer of recordable material.

Clause 5: The method of clause 3, wherein the beams impinge on the opposite surfaces of the layer of recordable material.

Clause 6: The method of clause 2, wherein the convergence angle of the beams is 180±45°, preferably 180±30°, and most preferably 180±20°, and the beams have same circular polarizations thereby inducing helical orientational patterns in the layer of optically recordable material.

Clause 7: The method of clause 6, wherein the beams impinge on the opposite surfaces of the layer of recordable material.

Clause 8: The method of clause 6, wherein the beams impinge on the same surface of the layer of recordable material.

Clause 9: The method of any of clauses 3-8, wherein incidence angles of the recording beams are equal.

Clause 10: The method of any of clauses 3-8, wherein incidence angles of the recording beams are not equal.

Clause 11: The method of clause 1, wherein the beams are collimated (e.g., the beams have plane wave fronts).

Clause 12: The method of clause 1, wherein one beam has a plane wave front and another beam has a spherical wave front.

Clause 13: The method of clause 1, wherein both beams have spherical wave fronts.

Clause 14: The method of clause 1, wherein the optically recordable polarization sensitive and photocrosslinkable material is a monomer or oligomer including a photosensitive fragment undergoing cycloaddition reaction.

Clause 15: The method of clause 1, wherein the optically recordable polarization sensitive and photocrosslinkable material is a polymer or copolymer including a photosensitive fragment undergoing cycloaddition reaction.

Clause 16: The method of clause 15, wherein a photosensitive fragment is a cinnamate fragment.

Clause 17: The method of clause 15, wherein a polymer is a liquid crystal polymer.

Clause 18: The method of clause 15, wherein a polymer is an amorphous polymer.

Clause 19: The method of any of clauses 1-18, wherein the patterns are created at an ambient temperature.

Clause 20: The method of any of clauses 1-18, wherein the patterns are created at a temperature corresponding to liquid crystal phase.

Clause 21: The method of any of clauses 1-18, wherein a layer of optically recordable material with the created patterns is annealed at a temperature corresponding to liquid crystal phase, thereby enhancing orientational patterns.

Clause 22: A hologram based on the layer of optically recordable material with periodic orientational patterns induced according to the method of any of clauses 1-21.

Clause 23: A hologram having periodic orientational patterns, wherein the hologram satisfies a condition that Klein parameter Q is greater than or equal to 10, wherein the Klein parameter Q is defined as follows:

$$Q = \frac{2\pi\lambda d}{\Lambda^2 n},$$

where d is a hologram thickness, $\lambda$ is a wavelength of light, $\Lambda$ is an averaged period of holographic grating and n is an averaged refractive index of the recordable medium.

Clause 24: The hologram of clause 23, further having orientational patterns induced by the method of clause 3 or 6.

Clause 25: A polarization volume holographic element made by any combination of clauses 1-24.

Clause 26: The polarization volume holographic element of clause 25, wherein the polarization volume holographic element does not include a photoalignment layer.

Clause 27: A polarization volume holographic element, comprising a layer of optically recordable material that contains two and more areas in which single holograms are recorded under different exposure conditions.

Clause 28: A polarization volume holographic element, comprising a layer of optically recordable material that contains multiple holograms recorded at the same location under different exposure conditions.

Clause 29: A polarization volume holographic element, including two and more layers of optically recordable media coupled with one another so that the layers contain holograms recorded under same or different exposure conditions.

Clause 30: The polarization volume holographic element of clause 29, wherein one or more stacked holograms are made of reactive mesogen or liquid crystal aligned by a patterned alignment layer.

What is claimed is:

1. A method of creating orientational patterns in a bulk of photosensitive materials, comprising:
   providing a layer of optically recordable polarization sensitive and photocrosslinkable material having a thickness that is greater than, or equal to, a predefined thickness, a first surface and a second surface that is opposite to the first surface; and
   forming, in the layer of optically recordable material, periodic orientational patterns by concurrently illuminating the layer of optically recordable material with two coherent beams of polarized light thereby inducing the periodic orientational patterns,
   wherein the convergence angle of the beams is 180±45°, and the beams are circularly polarized and have the same circular polarizations thereby inducing helical orientational patterns in the layer of optically recordable polarization sensitive and photocrosslinkable material.

2. The method of claim 1, wherein the beams impinge on the opposite surfaces of the layer of optically recordable polarization sensitive and photocrosslinkable material.

3. The method of claim 1, wherein the beams impinge on the same surface of the layer of optically recordable polarization sensitive and photocrosslinkable material.

4. The method of claim 1, wherein incidence angles of the beams are equal.

5. The method of claim 1, wherein incidence angles of the beams are not equal.

6. The method of claim 1, wherein both of the two coherent beams are collimated so that the two collimated coherent beams illuminate the layer of optically recordable material.

7. The method of claim 1, wherein one beam has a plane wave front and the other beam has a spherical wave front.

8. The method of claim 1, wherein both beams have spherical wave fronts.

9. The method of claim 1, wherein the optically recordable polarization sensitive and photocrosslinkable material is a monomer or oligomer including a photosensitive fragment undergoing cycloaddition reaction.

10. The method of claim 1, wherein the optically recordable polarization sensitive and photocrosslinkable material is a polymer or copolymer including a photosensitive fragment undergoing cycloaddition reaction.

11. The method of claim 10, wherein the photosensitive fragment is a cinnamate fragment.

12. The method of claim 10, wherein the polymer is selected from the group consisting of a liquid crystal polymer and an amorphous polymer.

13. The method of claim 1, wherein the patterns are created at an ambient temperature or a temperature corresponding to liquid crystal phase.

14. The method of claim 1, further comprising annealing the layer of optically recordable polarization sensitive and photocrosslinkable material with the periodic orientational patterns, thereby enhancing the periodic orientational patterns.

15. The method of claim 1, wherein the periodic orientational patterns include variation of the orientation of the optically recordable polarization sensitive and photocrosslinkable material along each axis of the Cartesian coordinate system, one axis of the Cartesian coordinate system being perpendicular to the first surface.

* * * * *